(12) United States Patent
Dittmann et al.

(10) Patent No.: US 11,570,269 B2
(45) Date of Patent: Jan. 31, 2023

(54) BROKER-MEDIATED CONNECTIVITY FOR THIRD PARTIES

(71) Applicant: SAP SE, Walldorf (DE)

(72) Inventors: Ralf-Dietmar Dittmann, St. Leon-Rot (DE); Mathis Wieder, Ketsch (DE); Yves Lorat, Walldorf (DE); Norbert Ottahal, Mannheim (DE); Stefan Sturm, Ruesselsheim (DE); Tim Buchholz, Reilingen (DE); Timo Ellenberger, Schifferstadt (DE); Christopher Black, Philadelphia, PA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/008,891

(22) Filed: Sep. 1, 2020

(65) Prior Publication Data

US 2022/0070270 A1 Mar. 3, 2022

(51) Int. Cl.
*G06F 15/16* (2006.01)
*H04L 67/562* (2022.01)
(Continued)

(52) U.S. Cl.
CPC ............ *H04L 67/562* (2022.05); *H04L 12/66* (2013.01); *H04L 67/141* (2013.01);
(Continued)

(58) Field of Classification Search
CPC ... H04L 67/141; H04L 67/143; H04L 67/146; H04L 67/2809; H04L 12/66; H04L 69/16; H04L 67/562

(Continued)

(56) References Cited

U.S. PATENT DOCUMENTS 7,334,018 B2  2/2008 Elms
7,590,987 B2  9/2009 Behrendt et al.
(Continued)

OTHER PUBLICATIONS

Dondeti, "SAP Remote Access and Connectivity (SAP RAC)", available from https://blogs.sap.com/2019/01/03/sap-remote-access-and-connectivity-sap-rac/, 10 pages (Jan. 2019).

(Continued)

*Primary Examiner* — Bharat Barot
(74) *Attorney, Agent, or Firm* — Klarquist Sparkman, LLP

(57) ABSTRACT

Methods and systems are disclosed for providing third party connectivity to installed software at a customer site through a broker infrastructure. A uniform facility for powerful and secure third party access to customer software installations is provided. Multiple TCP-based session types including source code debug and database sessions are supported. A target backend and session type are selected by an authorized agent logged into the broker infrastructure. A communication session is established between environments of the agent's frontend tool and the backend. The agent can perform maintenance or troubleshooting on the backend using the full capabilities of the frontend tool. Data exchange between frontend and backend utilizes TCP connections within the communication session, and is mediated by a connectivity framework within the broker infrastructure. Customer control over access to target backends is supported.

20 Claims, 11 Drawing Sheets

(51) Int. Cl.
  *H04L 67/141* (2022.01)
  *H04L 67/146* (2022.01)
  *H04L 67/143* (2022.01)
  *H04L 12/66* (2006.01)
  *H04L 69/16* (2022.01)

(52) U.S. Cl.
  CPC .......... *H04L 67/143* (2013.01); *H04L 67/146* (2013.01); *H04L 69/16* (2013.01)

(58) Field of Classification Search
  USPC ................. 709/217–219, 227–228, 223–224
  See application file for complete search history.

(56) References Cited

U.S. PATENT DOCUMENTS

| | | | |
|---|---|---|---|
| 7,703,024 B2 | 4/2010 | Kautzleben et al. | |
| 7,818,721 B2 * | 10/2010 | Sundararajan | G06F 11/3644 717/130 |
| 7,849,445 B2 | 12/2010 | Tran | |
| 7,945,677 B2 | 5/2011 | Fleischer et al. | |
| 8,161,169 B2 | 4/2012 | Fleischer et al. | |
| 8,438,535 B2 | 5/2013 | Sun | |
| 8,555,176 B2 * | 10/2013 | Elumalai | H04L 67/14 715/810 |
| 9,117,019 B2 | 8/2015 | Wintergerst et al. | |
| 9,183,540 B2 | 11/2015 | Eberlein et al. | |
| 9,762,613 B2 * | 9/2017 | Cherukuri | H04L 63/20 |
| 9,807,169 B2 | 10/2017 | Blumenthal-Barby et al. | |
| 9,860,249 B2 * | 1/2018 | Dulkin | H04L 63/10 |
| 10,992,744 B1 * | 4/2021 | Kutuzov | H04L 67/61 |
| 2005/0198501 A1 * | 9/2005 | Andreev | H04L 63/0815 713/168 |
| 2010/0023602 A1 * | 1/2010 | Martone | G06F 8/60 709/220 |
| 2014/0157398 A1 * | 6/2014 | McKinney | H04L 61/2592 726/15 |
| 2015/0271162 A1 * | 9/2015 | Dulkin | H04L 63/08 726/7 |
| 2016/0371172 A1 * | 12/2016 | Rumsey | G06F 3/0488 |
| 2021/0149788 A1 * | 5/2021 | Downie | G06F 11/3604 |

OTHER PUBLICATIONS

SAP, "Connecting to a Remote System", downloaded from https://help.sap.com/viewer/8c44f49685f44be4aa420bbf6393aeea/7.3.20/en-US/47b1a87eac671599e10000000a42189c.html on Aug. 17, 2020, 2 pages.

SAP, "Enabling/Disabling Remote Access in FPN Connections", downloaded from https://help.sap.com/doc/saphelp_nw73ehp1/7.31.19/en-US/49/5c8ef94a662221e10000000a42189d/content.htm?no_cache=true on Aug. 17, 2020, 2 pages.

SAP, "Remote Support", downloaded from https://support.sap.com/en/tools/connectivity-tools/remote-support.html#section on Aug. 17, 2020, 6 pages.

SAP, "SAP Integration and Certification Center", available from https://www.sap.com/docs/download/2017/02/683d110c-a77c-0010-82c7-eda71af511fa.pdf, pp. 1-8 (apparent date May 2020).

SAP, "Setting Up Service Connections for SAP Remote Support", downloaded from https://help.sap.com/saphelp_nwpi711/helpdata/en/96/ea39e6feb4457793cb00d1fee4e8fd/content.htm?no_cache=true on Aug. 17, 2020, 2 pages.

* cited by examiner

BROKER-MEDIATED CONNECTIVITY FOR THIRD PARTIES

BACKGROUND

As software grows more complex, a software installation can incorporate numerous applications from different vendors, such as from a primary vendor, partners, or other third parties. For maintenance and troubleshooting, it can be desirable to provide vendors with controlled access to their installed applications. There is a tension between requirements for access, requirements for customer security and privacy, and requirements for protecting vendors' intellectual property.

Conventionally, vendor access has been limited in scope, e.g. to screen share sessions, which do not allow the vendor to exchange data with a target software installation. Data exchange can be required for live source code debugging, for example. As an alternative, more powerful vendor access can be negotiated individually for each vendor and application, which introduces a significant burden of management and oversight, a plethora of access points, and concomitant security risks. Accordingly, there remains a need for improved technologies for controlled, uniform, trusted access to installed software.

SUMMARY

In brief, the disclosed technologies provide connectivity to a software installation on a customer network through a broker infrastructure. The broker infrastructure can support a wide range of session types between any of multiple partners and any of multiple customers. A customer can configure combinations of software products (applications or application instances), session types, partners, or individual agents for which external access is authorized. An authorized agent can log into the broker infrastructure and select a target product ("backend") and session type. From within the broker infrastructure, the agent can initiate a communication session between the agent's partner-side computing environment and the customer-side computing environment hosting the selected target product. Then, from a product frontend in the agent's partner-side computing environment, the agent can perform maintenance or troubleshooting on the backend using the full capabilities of the partner-side frontend tools. Data exchange between frontend and backend can utilize connections, such as TCP connections, within the communication session. The disclosed technologies enable the broker to provide a uniform facility for powerful and secure third party access to customer software installations, with customer control over the permitted access.

In certain examples, the disclosed technologies can be implemented as a computer-implemented method for establishing a communication session. A target application instance within a target computing environment is selected, from within a broker infrastructure, for a communication session with a partner application within a remote partner network. A first link to a connectivity gateway within the remote partner network is initiated from the broker infrastructure. A communication session between the connectivity gateway and the target computing environment is established through: the first link; the broker infrastructure; and a second link coupling the broker infrastructure with the target computing environment.

In some examples, the session enables an agent at the remote partner network to perform troubleshooting or maintenance of the target application instance. Selecting the target application instance can be responsive to user input by an agent of the partner network. The communication session can be operated at least partly by the agent. The broker infrastructure can forward a first request for establishing a connection within the communication session, received from the partner application through the first link, to the target application instance through the second link, and can forward data traffic from the partner application to the target application instance, or vice versa, over the established connection. The selecting of the target application instance can be performed from among a plurality of available application instances by an agent of the remote partner network. The plurality of available application instances can be restricted to application instances for which the agent is authorized. The available application instances can include a second instance, different from the target application instance, which is located in a second computing environment, different from the target computing environment.

In further examples, the method can include selecting type of the communication session, from within the broker infrastructure. The selecting of the type of the communication session can be made from among a plurality of available types conforming to respective TCP-based protocols. The available types can include source code debug session type and a database session type. The selecting of the type of the communication session can be performed from among a plurality of available types by an agent of the remote partner network and the plurality of available types can be restricted to types for which the agent is authorized on the target application instance.

The links between the broker infrastructure and the remote partner network, including the first link, can be restricted to links initiated from the broker infrastructure. There may be no provision to initiate such links from the remote partner network. The communication session can be closed when work of the communication session is complete. Closing can be initiated by an agent of the remote partner network. Closing can be initiated within the broker infrastructure.

In certain examples, the disclosed technologies can be implemented as computer-readable media storing first instructions and second instructions executable on hardware processors. Execution of the first instructions implements a remote connectivity portal through which: a remote client can be authenticated; a selection of a target application can be received from the remote client; and the remote client can receive notifications. Execution of the second instructions implements a remote connectivity framework, which is configured to: initiate a secure link between the remote connectivity framework and a gateway in a remote partner computing environment, responsive to the selection of the target application. The remote connectivity is further configured to forward a request, received from a support application in the remote partner computing environment via the secure link, for establishing a connection between the support application and the selected target application. The remote connectivity framework is also configured to and forward data from the support application to the selected target application, after the request has been accepted by the selected target application.

In some examples, the request is a first request and the instructions can include third instructions. Execution of the third instructions can implement the gateway in the remote partner computing environment. The gateway can be configured to forward the request from the support application to the remote connectivity framework, to forward data (originating at the target application) from the remote connectivity framework to the support application, and to forward data (destined for the target application) from the support application to the remote connectivity framework. The instructions can include fourth instructions which, when executed on hardware processors, allow an agent of a given application to update the information at the server for the given application. The authorization of the user of the remote client to the given application can be enabled or disabled. Configuration of connection types can be made, e.g. configuring which among a plurality of connection types are available, to the user of the remote client, for connecting to the given application.

In further examples, the remote connectivity portal can be further configured to retrieve, from a server, information of multiple target applications with which a user of the remote client is authorized to connect. The target application can be selected from these multiple target applications.

In certain examples, the disclosed technologies can be implemented as a broker computing environment and a remote connectivity framework implemented in the broker computing environment. The broker computing environment includes one or more hardware processors with memory coupled thereto and one or more network interfaces, through which the broker computing environment is coupled to a target computing environment and a partner computer environment over respective networks. The remote connectivity framework is configured to respond to a session request by initiating first and second secure links with the target computing environment and the partner computing environment respectively, and by joining the first and second secure links to establish a secure duplex communication session between the partner and target computing environments.

In some examples, the remote connectivity framework can be further configured to forward, between a frontend application in the partner computing environment and a backend application in the target computing environment, requests to establish connections and still further configured to forward data over the established connections. The remote connectivity framework can be hosted in the cloud. The remote connectivity framework can be configured to concurrently support multiple secure sessions between (a) a plurality of remote computing environments, including the partner computing environment, and (b) respective target computing environments, including the target computing environment.

In additional examples, the system can include a remote connectivity portal implemented in the broker computing environment. The remote connectivity portal can be configured to authenticate a remote user, and to provide the remote user with access to resources within the broker computing environment, including the remote connectivity framework, for selecting a backend application in the target computing environment and for initiating the session request.

In further examples, the system can include a remote connectivity gateway implemented in the partner computing environment. The remote connectivity gateway can be configured to provide an endpoint for the second secure link within the partner computing environment.

The foregoing and other objects, features, and advantages of the invention will become more apparent from the following detailed description, which proceeds with reference to the accompanying figures.

DETAILED DESCRIPTION

Introduction

Figure 1:
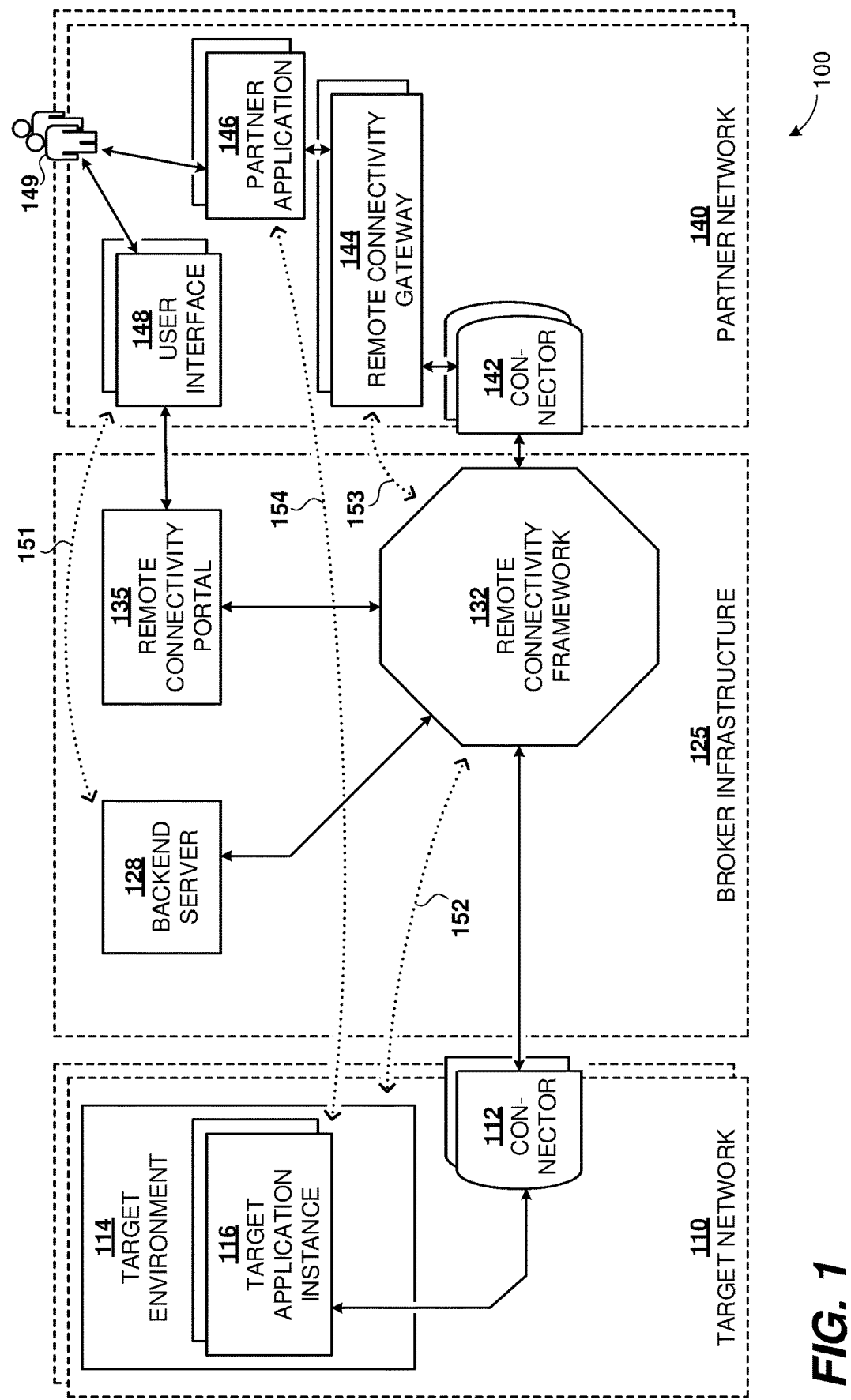
FIG. 1 is a diagram of a first example architecture within which the disclosed technologies can be deployed.

It is often desirable for software installations at customer sites to be accessible by remote partners, for maintenance, troubleshooting, or other activities. However, security and protection of intellectual property can be important concerns. Conventional approaches have been limited in applicability or limited in capability. As an example of the former, a specialized agreement can be negotiated between a software vendor and a customer, but may not be extensible to partners of the software vendor providing add-ons to a base software product. As an example of the latter, screensharing interfaces are widespread, but do not permit direct exchange of data or files between a remote agent and a customer site, nor do they permit integrated operation of a remote frontend with a customer backend. In some cases, a remote agent can be given privileges to login directly to the customer system, however this can raise its own set of problems. For example, it can be difficult to limit the agent's actions on the target software, or elsewhere on the customer site. Another problem can arise e.g. for source code debugging, where it can be undesirable to load source code onto a customer system for intellectual property reasons.

The disclosed technologies solve these problems and more to provide a uniform connectivity solution that is flexible, secure, and largely future-proof. In examples, a broker infrastructure mediates access to the customer software, through four external channels. Two channels can be customer-facing and partner-facing portals. A customer-side agent can use a customer-facing portal to configure e.g. which partners or partner agents are authorized to access which software applications or instances using which types of connections, thus providing fine-grained or coarse-grained access control. A partner-side agent can use a partner-facing portal to authenticate himself/herself, and to select a target application and connection type. These portals can provide a limited set of features for agents to interact with the broker infrastructure itself, without being able to connect through to other networks. The other two channels can be data channels coupling the broker infrastructure to respective endpoints within the customer network and the partner network. The data channels can be implemented with tunnels (e.g. to traverse firewalls) or over other links. For security, the data channels can be restricted to being established from within the broker infrastructure. The partner-side and customer-side data channels can be joined to establish a session between the endpoints. In examples, the session can be a TCP session. The session can be limited to one or more connection types for which the partner-side agent is authorized or as selected by the agent on the partner-side portal. A partner-side frontend can be coupled to the customer-side backend over the session. The frontend and backend can interact using the one or more connection types as per the session configuration.

The separation of portals from data channels, together with control of data channels from within the broker infrastructure, allows the broker infrastructure to provide robust security for remote access. The customer can maintain control of all access permissions to any degree, and can rely on the broker infrastructure as a single trusted mediator with any number of remote partners. A TCP based communication architecture is widely applicable today and readily extensible to any future TCP based connection types. A single broker infrastructure can provide communication between multiple customer-partner pairs concurrently.

These and other aspects of the disclosed technologies are described further herein.

Terminology

An "agent" is an autonomous actor. An agent can be a person, such as a support engineer of a software partner (thus, a partner-side agent), or information technology (IT) staff of a customer (thus, a customer-side agent). However, this is not a requirement and, in some examples, functions of an agent can be provided by suitable software (thus, a software agent). In some examples, partner-side agents or customer-side agents can log into a portal of disclosed broker infrastructure to establish a presence within the broker infrastructure and execute appropriate functions. An agent can be a user of the broker portal and/or a user of applications in respective partner-side or customer-side computing environments.

An "application" or "software application" is a computer-executable program performing functions for one or more clients, and can be distinct from an operating system, a software library, a test suite, or a development environment. Additionally, some applications can operate without clients, e.g. launched by a supervisor or another application, performing tasks autonomously or in an event-driven mode. An application can include both executable instructions (dubbed "code" or "program code") and non-executable data (dubbed "application data" or "program data"). Many modern applications can support multiple clients concurrently, and each client can be isolated from other clients, so that each client perceives having its own copy of the application. These actual or perceived copies of the application are dubbed "application instances." Two application instances can have distinct copies or versions of at least some program code and/or some program data, but can otherwise share at least some program code and/or some program data. The term application instance extends to an application having a single instance. An application can have one or more engines (dubbed "backends") performing the work of the application (e.g. performing underlying data operations, maintaining state, generating or responding to requests, and so forth) and can provide one or more interfaces (dubbed "frontends") for users or external software entities to interact with the application. To illustrate, a common email system can have a mail server (backend) and one or more email clients (frontend). An application can support one, a few, or many frontends, supporting e.g. screenshare, remote terminal or command-line access, a webpage or browser interface, source code debugging, an interactive database session, a mobile app, or other interfaces using e.g. TCP-based protocols.

"Authentication" refers to a process of verifying an agent's credentials so as to allow the agent access to a secure resource. Generally, an agent that has been authorized for the requested access can be successfully authenticated, while an unauthorized agent can fail authentication. Authentication can be performed using a password, a challenge, a biometric identifier, single sign on (SSO), two-factor authentication, or other techniques, in any combination.

"Authorization" refers to a permission granted to a given agent to have a given level of access to a given resource, or to an act of configuring such permission. Authorization can be enabled or disabled. The level of access can be restricted to specific forms of access, e.g. certain types of connections or communication sessions, or can be unrestricted. Authorization can be for specific agents or can be for any agent representing a given organization, such as a software partner.

A "broker" is an intermediary in a communication path. In disclosed examples, infrastructure of the broker can be used to set up or manage communication between two organizations, such as a customer (target) and a partner. The broker infrastructure can also mediate communication: by forwarding messages, requests, and other data; by monitoring or logging the communication; or by performing protocol translation or traffic control. In some examples, a broker can be a primary software vendor, the targets can be customer sites, and partners can be value-added software partners. However, this is not a requirement, and in other examples the broker can provide a remote connectivity service to software customers (targets) and software providers (partners), while being independent of the backend or frontend software applications themselves.

A "client" is a hardware or software computing entity that uses a resource provided by another hardware or software computing entity dubbed a "server."

A "cloud" is a multi-processor computing resource, accessible off-premises to multiple users over a public network such as internet, in which the users may not have control over which particular processors their applications are executed on.

"Communication" refers to transmission, reception, distribution, or exchange of data over a network. The network entities (e.g. computing systems) participating in communication are dubbed "nodes," however the term nodes excludes a transmission medium over which communication occurs. In disclosed examples, communication can be point-to-point (dubbed "duplex" if data transfer occurs in both directions), but this is not a requirement. Communication can also be broadcast or multicast.

The term "concurrent" refers to two or more activities that span a common time interval.

The term "configure" refers to an action of setting parameters for a software application or communication activity. To illustrate, a customer can configure available application instances, available session types, or authorized partners or agents. A partner agent can configure a communication session by selecting a target application instance or a session type. An "update" to a configuration changes some existing parameters.

A "connection" is a facility providing ordered communication between two nodes. That is, data units (e.g. packets, frames, or messages) transmitted from a source node are delivered in order at a destination node. In some examples, a connection can be implemented over a circuit or virtual circuit, so that data units travel a common path without overtaking each other, and in-order delivery can be guaranteed. However, this is not a requirement and other techniques, such as sequentially numbered packets in TCP, can be used to maintain delivery order. In disclosed examples, connections can be used between a customer-side product backend and a partner-side product frontend. Multiple connections can be used within a communication session. The connections can be sequential, non-overlapping, or concurrent. The lifecycle of a connection can include establishing the connection ("connecting"), data transfer (in one or both directions), and disconnecting.

The unqualified term "data" refers to any digital representation of information. "Data items" are data entities whose values convey particular meaning to an application instance. The transport of data over a communication path is dubbed "data traffic."

"Forwarding" refers to an act of receiving a message from a sender, and transmitting content of the message to another recipient. In some examples, the received message can be forwarded intact, while in other examples, a new message can be formed, e.g. by protocol conversion or header replacement, for onward transmission.

A "gateway" is a hardware or software module in one network providing an access point for communication with hardware or software in another network. In examples of the disclosed technology, a remote connectivity gateway can be implemented in a partner-side computing environment to act as an endpoint for a communication session with a customer-side computing environment. The remote connectivity gateway can be used as an access point to connect a partner-side product frontend with a customer-side product backend.

"Infrastructure" refers to a collection of one or more computer systems, optionally coupled over a communication network, hosting software to provide one or a set of services to other computer systems.

A "link" is a facility supporting communication from a first node to a known second node. A link can be bidirectional, also supporting communication from the second node to the first node.

"Maintenance" refers to routine activities to inspect, test, or upgrade installed software. Using the disclosed technologies, a partner-side agent can remotely connect with a customer-side application instance to perform maintenance of the application instance.

A "partner" is an organization seeking to remotely connect to a target software installation. In some examples, a partner can be a software vendor, and can be affiliated with a primary vendor providing the target software or the broker infrastructure as disclosed herein. The partner can have a number of agents and computing environments on a network dubbed a "partner network." Entities on the partner network are dubbed "partner-side" to distinguish from target software which can be on a target network of a customer, dubbed "target-side" or "customer-side." A partner-side computing environment can be a workstation, virtual computer, or server session controlled by a particular agent.

A "portal" is an outward-facing software module within a server, infrastructure, or software application through which external agents can access resources of the server, infrastructure, or software application. In disclosed examples, a remote connectivity portal can provide an access point to a remote connectivity framework and a backend server. In some examples, a portal can be implemented as a web server, and agents can access the portal and its underlying resources through a client browser.

A "protocol" is an agreed set of rules, syntax, semantics, synchronization, or error handling for communication between two or more nodes. Some protocols can be defined by a published standard (e.g. TCP or Internet Protocol (IP)), however this is not a requirement, and proprietary protocols can also be used. Protocols can be used concurrently in a stack, such as an Open Systems Interconnection (OSI) layer stack or an application layer stack (such as a NetWeaver application stack).

The terms "receive" and "transmit" refer to communication over a network, which can be in the form of a message. The communication can be electromagnetic, e.g. over wired, wireless, or optical media, but this is not a requirement.

The term "remote" refers to a computing resource located on a different network (e.g. a partner network) than a target application instance (e.g. on a customer network).

The term "remote connectivity" refers to technology enabling a remote party to connect to or communicate with a customer software installation. Generally, provision for security may be required for the remote party to access the customer software installation. In examples of the disclosed technology, a broker infrastructure can provide such security in a consistent, uniform manner while also supporting control by a customer.

A "remote connectivity framework" is a set of computing nodes and software for setting up, managing, or mediating remote connectivity communication. A remote connectivity framework can be part of a broker infrastructure, and can be cloud-hosted. The remote connectivity framework can be supported by a remote connectivity portal and a backend server within the broker infrastructure, and can be further supported by connectors, gateways, or endpoints within networks of remote connectivity participants.

A "remote connectivity portal" is a portal through which authorized external agents (e.g. agents of partners or customers) can configure or manage remote connectivity with other parties. A remote connectivity portal can also provide reports or notifications to agents, and an authentication facility.

A "request" is a message to which a substantive response ("response") is expected, that is, a response beyond an acknowledgment. A request can also be a message for which a recipient of the message is expected to take a specified action. In contrast, a "notification" or a "report" need not receive a substantive response, nor result in any specific action. A "session request" is a request to establish a communication session, and a "connection request" is a request to establish a connection, such as a TCP connection, within a communication session.

The term "secure" refers to communication that is private and protected against unauthorized participation. Security can be obtained through use of authentication, encryption, physically protected or private transmission media, or other techniques, in any combination.

A "session" is a collection of communications between two or more parties over a finite period of time during which the session participants are configured to expect communication from other participant(s) or to transmit communication to the other participant(s). A session can be a requirement for establishment of a TCP connection. In some disclosed examples, a communication session is between exactly two parties, such as a partner-side computing environment and a target-side computing environment, however this is not a requirement. In other examples, two agents having respective partner-side environments can collaborate concurrently on a single target application instance in a single session, or one or more partner agents can concurrently work on two or more target application instances (e.g. to troubleshoot interacting customer-side applications) in a single session. In further examples, such examples can be implemented as multiple two-party sessions. A session can be conducted over one or more links. The collection of activities performed during a session is dubbed the "work" of the session. A session can be established or opened responsive to a session request. Upon completion of the work, the session can be closed.

A "session type" can designate one or more ports or protocols available during a session. Different ports can be utilized by different types of connections. Session or connection types can include e.g. screenshare, remote terminal or command-line access, a webpage or browser interface, source code debugging, an interactive database session, an R/3 connection, a mobile app, or other interfaces using e.g. TCP-based protocols, over respective ports.

"Software" refers to computer-executable programs or instructions and associated data structures. Software can be in active or quiescent states. In an active state, software can be loaded into memory, or can be undergoing execution by one or more processors. In a quiescent state, software can be stored on computer-readable media, awaiting transmission or execution.

A "support application" is a software application which can be used to maintain, troubleshoot, or provide other support to a target software installation. In examples, a support application can be a (partner-side) product frontend which can connect to a (customer-side) product backend. The connection can be over a communication session mediated by a broker infrastructure, as disclosed herein.

The term "target" refers to any software, environment, or network to which remote connectivity is sought by a partner. In some examples, target entities can be operated by, or on behalf of, a customer of the software. The target software can include one or more software applications hosted in one or more computing environments on the target network. Each software application can have one or more instances, dubbed "target application instances."

"Transmission Control Protocol" (TCP) is an internet protocol providing reliable, ordered, delivery of data units between nodes of a communication network. TCP is a connection-oriented transport layer protocol.

"Troubleshooting" refers to an activity of diagnosing or repairing a suspected or identified problem with installed software. Using the disclosed technologies, a partner-side agent or support application can remotely connect with a customer-side application instance to troubleshoot the application instance.

A "user interface" (UI) is hardware or software enabling a user or other agent to interact with a computer system or software application. A user interface can be graphical, e.g. presented as a web page on a browser or an app on a mobile device, however this is not a requirement. An application programming interface (API), a text-mode console, voice response or other interfaces can also be used as a UI. Input provided through a UI is dubbed "user input."

First Example System Architecture

FIG. 1 is a diagram 100 of a first architecture within which the disclosed technologies can be deployed. A broker infrastructure 125 is situated between a target network 110 and a partner network 140. An agent 149 having a presence in the partner network 140 can use partner applications 146 in conjunction with application instances 116.

Target network 110 can be a customer network, and can have network level security, with protections such as firewalls and virtual private networks (VPN) for external access to the network 110. Within network 110, a number of computing environments 114 (such as servers, workstations, personal computers, virtual computers) can implement one or more instances 116 of target applications. Application instances 116 can include multiple instances of a common application (such as a database query process), or instances of different applications (e.g. applications for customer relationship management (CRM), enterprise resource planning (ERP), product lifecycle management (PLM), analytics, manufacturing; products at presentation layer, business layer, integration layer, connectivity layer, persistence layer, or other layers of an application layer stack; or authentication, communication, or other services). Target network 110 can be located at a single site, or can be distributed over multiple sites.

Broker infrastructure 125 can provide secure communication services between personnel, equipment, or software at one or more partner networks 140, and environments 114 or application instances 116 at one or more target networks 110. Broker infrastructure 125 can include a remote connectivity framework 132 configured to control communication between the broker infrastructure 125 and other networks such as 110, 140. Broker infrastructure 125 can incorporate software for establishing communication at one or more layers of a communication stack; for forwarding such communication, with protocol conversion or traffic flow control as required; or for monitoring or logging such communications. The remote connectivity framework 132 can interface with connectors 112, 142 at respective networks 110, 140. For example, connector 112 can be a tunnel endpoint or virtual private network (VPN) node within target network 110, for embodiments in which a tunnel or VPN is used to provide secure communication through a firewall protecting network 110.

Remote connectivity framework 132 can also interface with a backend server 128 and a remote connectivity portal 135 within the broker infrastructure 125. Remote connectivity portal 135 allows agents from partner network 140 to open, consume, or close sessions with environments 114 of target networks 110. Portal 135 can support a user interface (such as 148, which can be a browser) through which agents 149 present on partner network 140 can configure communication sessions to target environments 114 through the remote connectivity framework 132. Portal 135 can also support authentication of agents 149, termination of communication sessions, or presentation of notifications, logs, or statistics to agents 149.

Backend server 128 can maintain information required to set up and manage communications between partners and targets through the remote connectivity framework 132. This information can include availability of target instances 116 and associated session types, authorization information for agents 149 for the respective target applications or instances 116, or navigation menu structures to support the user experience (UX) of an agent 149 logged into the portal 135. Server 128 can also store information required by framework 132, for example routing tables, protocols, keys, passwords, or other information required to establish communication between a given application 146 in partner network 140 and a given target application instance 116 in target network 110. Some of the information stored at server 128 can be subject to update or management by an agent or customer (not shown) at target network 110. For example, the agent can update accessible applications 116 as new applications are deployed; can update the types of access enabled for specific partner networks 140, agents 149, or specific applications or application instances 116; or can update routing information as the topology of target network 110 evolves. Such target configuration can be accessible through remote connectivity portal 135, or through another portal. A user interface for customer configuration (not shown) can be different from the user interface 148 used for interface with partners. To illustrate, where a browser interface 148 is used, partners can access a website having URL (Uniform Resource Locator) partners.portal.broker.com, while customers can access a website having URL customers.portal.broker.com to obtain appropriate functionality.

On partner network 140, a remote connectivity gateway 144 can serve as an endpoint for communication links with the remote connectivity framework 132. Operated by agent 149, a partner application 146 can connect to target application instance 116 through the gateway 144. Gateway 144 can act as a proxy for application instance 116 within the partner network 140. Agent 149 can also utilize user interface 148 to perform setup and management functions for partner target communication through the remote connectivity portal 135. Dotted arrow 151 indicates a communication process between interface 148 (which can be operated by an agent 149) and backend server 128. Process 151 can be used to authenticate agent 149, or to select a target instance 116 and session type for communicating with the instance 116.

Upon selection of the target and type of a desired communication session, the remote connectivity framework 132 can initiate secure communication link 152 with target environment 114 and another secure communication link 153 with the gateway 144. The links 152, 153 can be joined as a secure communication session between the gateway 144 and the target environment 114. The secure communication session can be mediated by the remote connectivity framework 132. Mediation can include forwarding requests or data in either direction, performing any required protocol translation, monitoring data traffic, collecting statistics, or terminating the communication session. Termination can be initiated in response to agent input via the portal 135, for example when work of the communication session has been completed.

With a communication session established between gateway 144 and target environment 114, the partner application can request a connection 154, within the communication session, with a specific target instance 116. Over connection 154, data can be exchanged in any one or both directions, and the connection 154 can be closed from either side. A single session can include one, a few, or many connections between partner application 146 and target instance 116. Each connection persists for the duration of a particular activity. In some examples, the connections can be sequential without temporal overlap, while in other examples, multiple connections can be live simultaneously.

Numerous variations and extensions of the architecture 100 can be implemented. As indicated in FIG. 1, broker infrastructure 125 can be coupled to a plurality of partner networks 140, or to a plurality of target networks 110. Broker infrastructure 125 can support multiple concurrent communication sessions between respective gateways 144 (at the same or different partner networks 140) and target environments 114 (in the same or different target networks 110), in any combination. A given agent 149 can concurrently connect to multiple target environments or application instances 116. In some examples, an agent 149 can be restricted to communicating with a single target network 110 at any given time, which can be a policy requirement to avoid risk of leaking data between two distinct target networks 110, so as to maintain privacy of each customer's data. All or part of the framework 132 or the infrastructure 125 can be hosted in the cloud. Each target network 110 can have its own connector 112. Each partner network 140 can have its own connector 142. A partner network can have multiple gateways 144. In some examples, each of multiple workstations (for respective agents 149) in the partner network 140 can have its own gateway 144 locally installed. Where agents 149 operate virtual machines, each virtual machine can have its own gateway 144.

First Example Method

Figure 2:
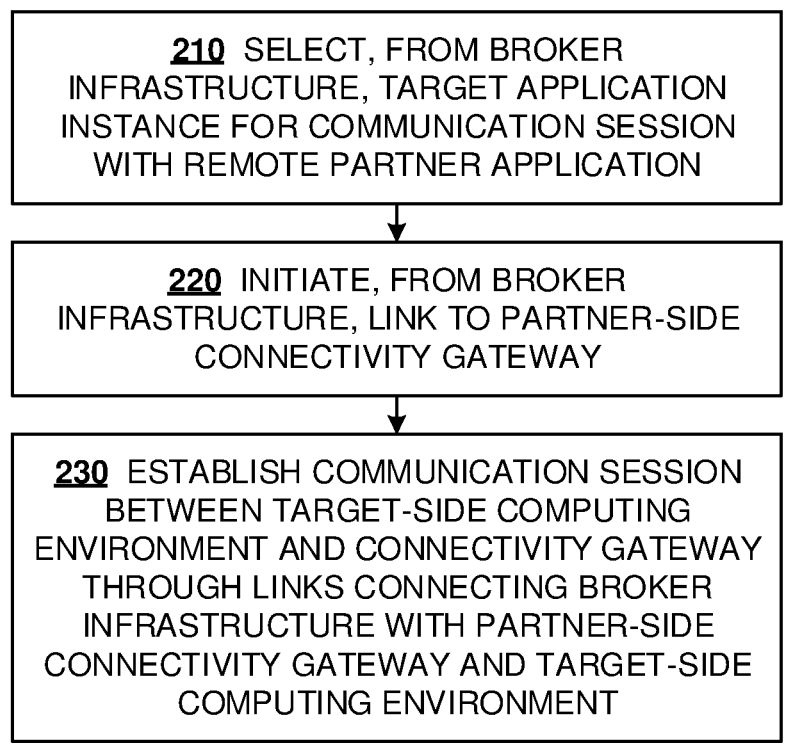
FIG. 2 is a flowchart of an example method for establishing a communication session according to the disclosed technologies.

FIG. 2 is a flowchart 200 of an example method for establishing a communication session according to the disclosed technologies. In this method, a communication session between partner-side and target-side entities is configured and established from within a broker infrastructure logically connected between partner-side and target-side networks.

At process block 210, a target application instance (similar to 116) can be selected for a communication session with a partner application (similar to 146). The selection can be made from within a broker infrastructure (125), for example by an external user of a client device logged in at a portal (135) of the broker infrastructure. The target application instance can be running within a target computing environment (112) on a target network (110), and the partner application can be running within a partner computing environment in a remote partner network (140).

At process block 220, a first link (similar to 153) can be initiated from the broker infrastructure to couple the broker infrastructure with a connectivity gateway (144) in the partner network. For example, a remote connectivity framework can send data to the connectivity gateway to set up the partner side of the first link. Then, at process block 230, a communication session can be established, between the connectivity gateway and the target computing environment, through the first link, the broker infrastructure, and a second link (similar to 152) coupling the broker infrastructure with the target computing environment.

Numerous extensions and variations of this method can be implemented. Block 210 can include selecting a type of the communication session (e.g. a remote terminal session, a database session, or a source code debug session). The second link can also be established in response to the selection made at block 210. The selection at block 210 can be responsive to user input by an agent of the partner network. The first or second link can be configured to limit session usage to endpoints or protocols specified during selection(s) made at block 210, for example by specifying which ports are allowed for use within the session. The selection of target application instance or session type can be made from among multiple application instances or session types for which an instant partner, or agent of the partner, is authorized. The available application instances can be distributed among multiple target computing environments. The available session types can conform to respective TCP-based protocols. The available session types can include a source code debug session type or a database session type. Database sessions can be supported for a wide range of public or proprietary access protocols, or for multiple query languages. Source code debug sessions can support a wide variety of languages, including general purpose languages such as Java and C++, or domain-specific languages such as SQL or ABAP. Sessions can include Windows Terminal Services (WTS) sessions or secure shell (SSH) tunnels. In some examples, links such as 153 between the broker infrastructure (or connectivity framework such as 132) and the connectivity gateway are restricted to being initiated from within the broker infrastructure. The connectivity gateway can be blocked from initiating such a link.

In further examples, links such as 152 between the broker infrastructure and a target computing environment are restricted to being initiated from within the broker infrastructure. Target computing environments or other target-side entities can be blocked from initiating a link to the connectivity framework. The method can include using the communication session for data exchange via connections between support application (146) and the selected target application instance, as described further herein. A partner-side agent can use the communication session for maintenance or troubleshooting of the selected target application instance. The method can further include closing the communication session when work of the session is complete.

Second Example System Architecture

Figure 3:
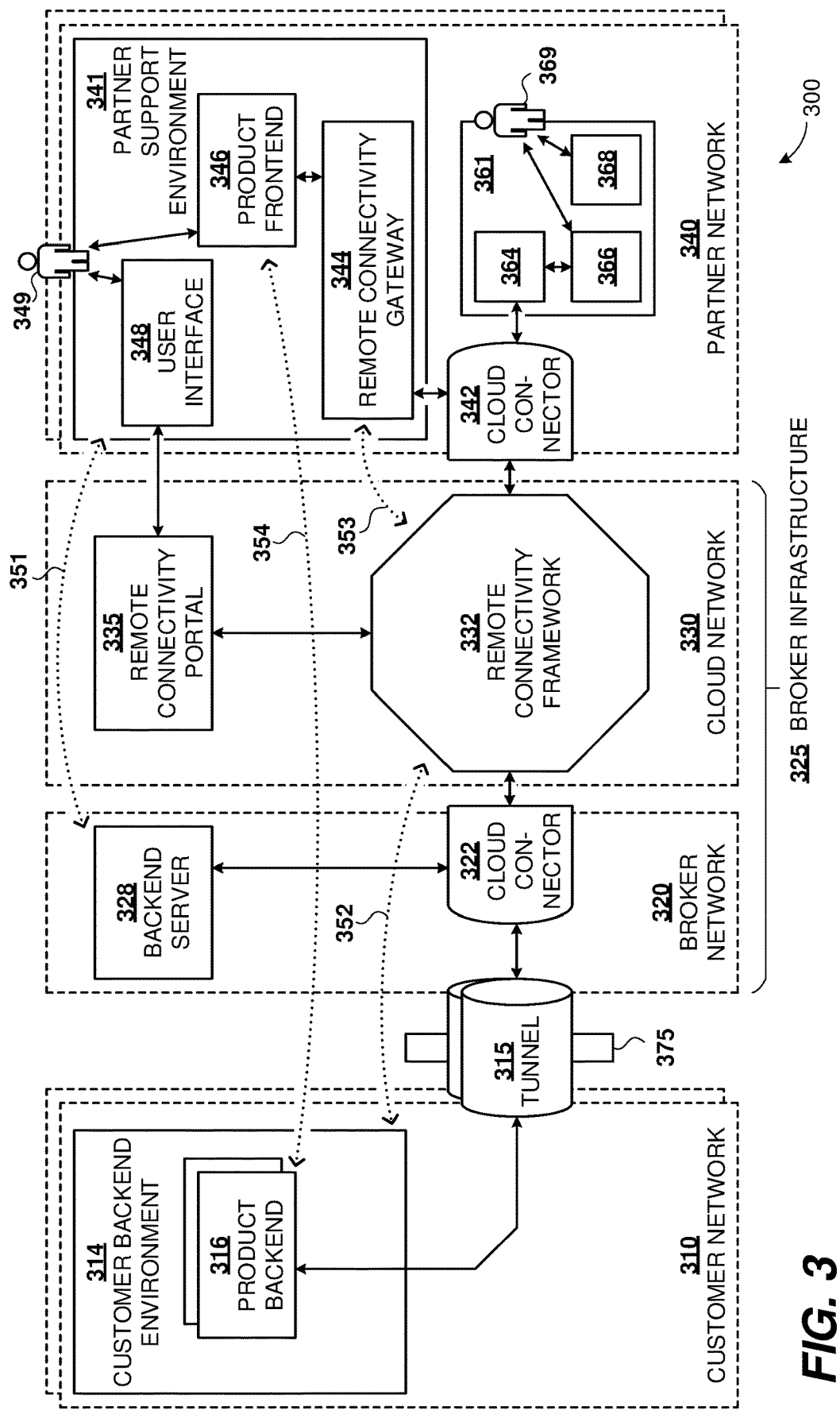
FIG. 3 is a diagram of a second example architecture within which the disclosed technologies can be deployed.

FIG. 3 is a diagram 300 of a second example architecture within which the disclosed technologies can be deployed. A broker infrastructure 325 is situated between a customer network 310 and a partner network 340. An agent 349 having a presence in the partner network 340 can use product frontend 346 in conjunction with a product backend 316.

Customer network 310 can have network level security, with protections such as firewall 375 or virtual private networks (VPN) for external access to the network 310. Within network 310, a backend environment 314 (e.g. a server, workstation, personal computer, or virtual computer) can implement one or more product backends 316. Product backends 316 can include multiple instances of a common product (such as a database query process), or instances of different products (e.g. applications for customer relationship management (CRM), enterprise resource planning (ERP), product lifecycle management (PLM), analytics, manufacturing; products at presentation layer, business layer, integration layer, connectivity layer, persistence layer, or other layers of an application layer stack; or authentication, communication, or other services). Customer network 310 can be located at a single site, or can be distributed over multiple sites.

Broker infrastructure 325 can provide secure communication services between product frontends at one or more partner support environments 341, 361 and customer backend environments 314 or product backends 316 at one or more customer networks 310. Broker infrastructure 325 can be distributed between cloud network 330 and a broker network 320, which can be in a data center. Broker infrastructure 325 can include a remote connectivity framework 332, depicted in the cloud 330, which can control communication between broker infrastructure 325 and other networks such as 310, 340. Broker infrastructure 325 can incorporate software for establishing communication at one or more layers of a communication stack; for forwarding such communication, including protocol conversion or traffic flow control as required; or for monitoring or logging such communications. The remote connectivity framework 332 can interface with cloud connectors 322, 342 at networks 320, 340. Computing nodes of networks 320, 340 can be off-cloud, and can be implemented on dedicated computing hardware.

Remote connectivity framework 332 can also interface with a backend server 328 and a remote connectivity portal 335. As illustrated, server 328 can be located within the broker network 320, and can connect to framework 332 through the cloud connector 322. As illustrated, portal 335 can be implemented in the cloud 330. However, these are not requirements, and in other examples, portal 335 can be located off-cloud in a data center, or server 328 can be hosted in the cloud. Remote connectivity portal 335 provides agents 349, 369 from partner network 340 with access to resources within broker infrastructure 325, including remote connectivity framework 332. Agents 349, 369 can open, consume, or close sessions with environments 314 of customer networks 310. Portal 335 can support user interfaces (such as 348, 368, which can be browsers) through which agents 349, 369 present on partner network 340 can configure communication sessions with customer backend environments 314 through the remote connectivity framework 332. Portal 335 can also support authentication of agents 349, 369, termination of communication sessions, or presentation of notifications, logs, or statistics to agents 349, 369.

Backend server 328 can maintain information required to set up and manage communications between partners and customers through the remote connectivity framework 332. This information can include availability of product backends 316 and associated session types, authorization information for agents 349, 369 for the respective product backends 316, or navigation menu structures to support the user experience (UX) of agents 349, 369 logged into the portal 335. Server 328 can also store information required by framework 332, for example routing tables, protocols, keys, passwords, or other information required to establish communication between a given frontend 346 in partner network 340 and a given product backend 316 in customer network 310. Some of the information stored at server 328 can be subject to update or management by an agent of a customer (not shown) at customer network 310. For example, the customer-side agent can update accessible backends 316 as new applications are deployed; can update the types of access enabled for specific partner networks 310, agents 349, 369, or specific applications or product backends 316; or can update routing information as the topology of customer network 310 evolves. Such backend access configuration can be accessible through remote connectivity portal 335, or through another portal. A user interface for customer configuration (not shown) can be different from the user interface 348 used for interface with partners.

On partner network 340, a remote connectivity gateway 344 can serve as an endpoint for communication links 353 with the remote connectivity framework 332. Operated by agent 349, a product frontend 346 can connect to product backend 316 through the gateway 344. Gateway 344 can act as a proxy for backend 316 within the partner network 340. Agent 349 can also utilize user interface 348 to perform setup and management functions for partner customer communication through the remote connectivity portal 335. Dotted arrow 351 indicates a communication process between interface 348 (which can be operated by an agent 349) and backend server 328. Process 351 can be used to authenticate agent 349, or to select a product backend 316 and session type for communicating with the backend instance 316.

Upon selection of the targeted backend and the type of a desired communication session, the remote connectivity framework 332 can initiate secure communication link 352 with backend environment 314 and another secure communication link 353 with gateway 344. In one direction, link 353 can follow a path from framework 332, via cloud connector 322 to broker network 320, and thence via secure customer-side tunnel 315 through firewall 375 onto the customer network 310, where the link can reach its endpoint at backend environment 314. In the other direction, link 353 can follow a substantially similar path, albeit in reverse order. Then, the links 352, 353 can be joined as a secure communication session between the gateway 344 and the customer environment 314. The secure communication session can be mediated by the remote connectivity framework 332. Mediation can include forwarding requests or data in either direction, performing any required protocol translation, monitoring data traffic, collecting statistics, or terminating the communication session. Termination can be initiated in response to user input via the portal 335, for example when work of the communication session has been completed.

With a communication session established between gateway 344 and customer environment 314, the product frontend can request a connection 354, within the communication session, with a product backend 316. Over connection 354, data can be exchanged in any one or both directions, and the connection 354 can be closed from either side. A single session can include one, a few, or many connections between product frontend 346 and product backend 316. Each connection persists for the duration of a particular activity. In some examples, the connections can be sequential without temporal overlap, while in other examples, multiple connections can be live simultaneously.

Partner network can include multiple compute environments similar to environment 341. FIG. 3 illustrates a second environment 361, which can be a workstation of a second agent 369. As shown, environment 361 has its own remote connectivity gateway 364 coupled through cloud connector 342 with the remote connectivity framework 332. Agent 369 can operate product frontend 366 to establish and consume connections over a communication session between gateway 364 and one or more backends 316. User interface 368 enables agent 369 to establish a presence at the remote connectivity portal 335 within the broker infrastructure 325.

In varying situations, environments 341, 361 can have concurrent sessions with the same or different customer backend environments 314. Particularly, in some examples, both environments 341, 361 can concurrently have connections to a same backend instance 316. For example, frontend 346 can operate a debug session or database session with backend 316, while frontend 366 can operate a screenshare session as an observer of the other session.

Numerous variations and extensions of the architecture 300 can be implemented. In some examples, a customer backend environment 314 can also be implemented in the cloud, in which case cloud connector 322 can be omitted from the path of link 352. A broker can implement additional frontends within broker network 320 or cloud network 330 to directly provide services to backends 316 through the same tunnel 315, independently of any partner. The broker network 320 can be coupled to multiple customer networks 310 over respective tunnels 315.

Example Software Architecture

Figure 4:
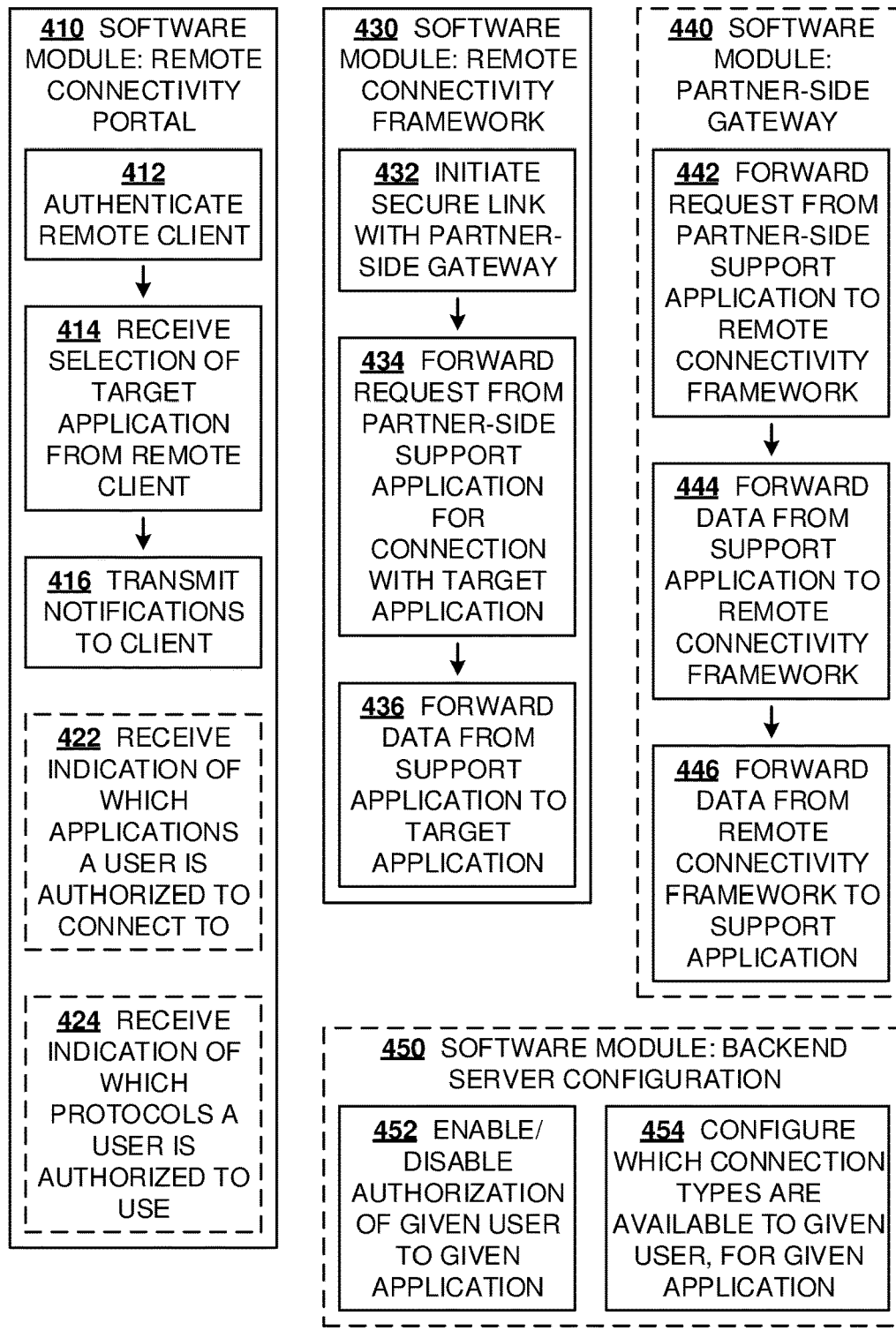
FIG. 4 is a diagram illustrating software architecture for implementing examples of the disclosed technologies.

FIG. 4 is a diagram 400 illustrating an example software architecture, with some variations also illustrated. Software modules 410, 430 are illustrated for a remote connectivity portal and a remote connectivity framework similar to portal 135 and framework 132 respectively. Dashed outlines indicate variations that can be included in some embodiments.

Remote connectivity portal software module 410 can be configured to perform several functions, as illustrated. Software block 412 can be configured to authenticate a remote client. The remote client can be a browser, app, or other client software being executed on a client device such as a terminal, workstation, laptop, tablet, or smartphone. Software block 414 can be configured to receive a selection of a target application, from the remote client, and software block 416 can be configured to transmit notifications to the client. Arrows between software blocks 412, 414, 416 indicate an order in which these software blocks can be executed in some instances.

In additional examples, portal software module 410 can be configured to perform additional functions. Software block 422 can receive an indication of which application(s) a particular agent, partner, or other user is authorized to connect to. Software block 424 can receive an indication of which protocols a logged-in user is authorized to use. In some instances, software blocks 422, 424 can be invoked after authentication by software block 412. Software block 422 can be invoked before target application selection through software block 414. That is, software blocks 422, 424 can provide data, e.g. from a backend server similar to 128, used to guide navigation and selection by a logged-in user.

Remote connectivity framework software module 430 can be configured to perform several functions, as illustrated. Software block 432 can initiate a secure link with a partner-side gateway similar to 144. Software block 434 can forward a request received, via the secure link, from a support application (similar to 146) in a partner computing environment for establishing a connection between the support application and the selected target application. The request can be forwarded to the computing environment of the target application. Following acceptance of the connection request by the target application, software block 436 can forward data from the support application to the target application. Arrows between software blocks 432, 434, 436 indicate an order in which these software blocks can be executed in some instances.

In additional examples, the architecture of FIG. 4 can also include software module 440 implementing a partner-side gateway similar to 144. Software block 442 of module 440 can be configured to forward a request from the support application to the remote connectivity framework. The request can be the connection request which can be subsequently handled by software block 434 as described herein, however other requests can also be forwarded. Software block 444 can forward data from the support application to the remote connectivity framework, for subsequent delivery to the target application, while software block 446 can forward data originating at the target application from the remote connectivity framework to the support application. Software blocks 444, 446 can be invoked after the connection requested by block 434 has been established. Arrows between software blocks 442, 444, 446 indicate an order in which these software blocks can be executed in some instances.

The architecture of FIG. 4 can also include software module 450 for configuring partner authorizations at a backend server such as 128. Software block 452 can enable or disable the authorization of a given user to connect to a given application, while software block 454 can configure which among multiple connections are available to a given user, on a given application. Software blocks 452, 454 can interactively, responsive to inputs from a customer-side agent similar to agent 919 of FIG. 9 herein. The agent can configure the backend server through software blocks 452, 454 on behalf of the given application.

Example Method for Selecting a Target

Figure 5:
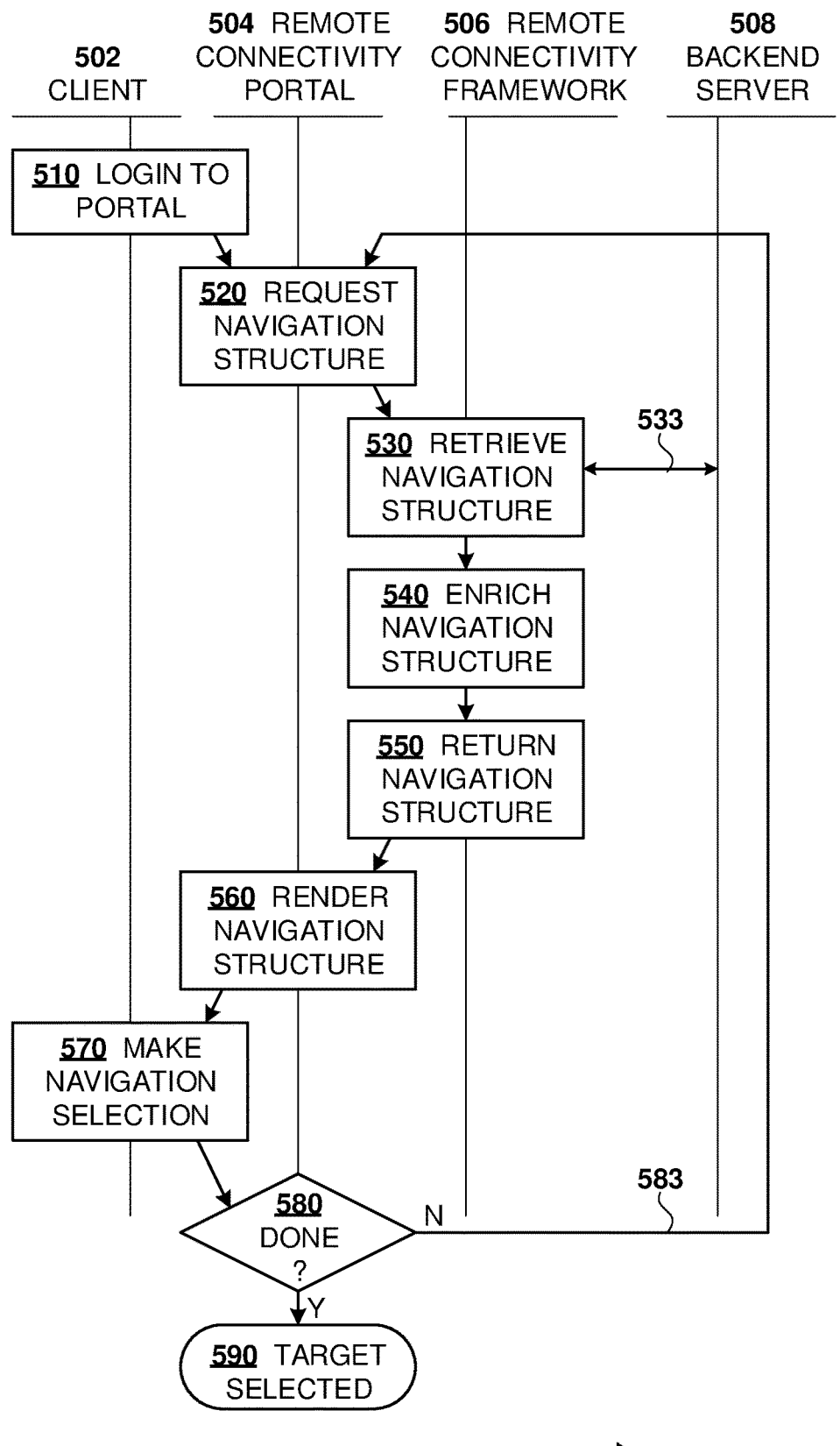
FIG. 5 is a flowchart of an example method for selecting a target according to the disclosed technologies.

FIG. 5 is a flowchart 500 of an example method for selecting a target according to the disclosed technologies. In this method, a remote connectivity portal 504, its client 502, a remote connectivity framework 506, and a backend server 508 interact to support selection of a target for a communication session. Client 502 can be a combination of software and hardware. Actions shown in the client column can be performed at the client or can be initiated from the client, for example by user input from an agent of the partner.

At process block 510, client 502 can be logged in to portal 504. Client 502 can incorporate client software (such as a browser or app) or client hardware (such as a workstation or mobile device) in any combination, and can be operated by or on behalf of an agent, such as a partner support engineer.

At block 520, the portal can issue a request to the remote connectivity framework 506 for a user interface (UI) navigation structure. At block 530, the framework 506 can retrieve the requested navigation structure from backend server 508, as indicated by arrow 533. At process block 540, the framework 540 can enrich the navigation structure, for example by incorporating session-specific information or network status information. As an example of the former, the navigation structure can indicate the choices already selected in a pre-existing session, or other parameters of the pre-existing session. At process block 550, the enhanced navigation structure can be returned to the connectivity portal 504, where it can be rendered to the client 502 at block 560.

At process block 570, a selection can be made at the client 502 and transmitted to the portal 504, following which decision block 580 can perform a check whether the selection is complete. If the selection is complete, the method can follow the Y branch from block 580 to block 590, where the method terminates with the target selected. However, if the selection is determined to be incomplete at block 580 (for example, if a selection at one level of a navigation structure exposes further selections to be made at a subsequent level of the navigation structure), then the method can follow the N branch from block 580 back to block 520 (via arrow 583), where a further navigation structure can be requested.

Numerous variations and extensions of the method can be implemented. Although the method has been described in the context of selecting a target, such as a target application instance, the method can also include selection of a session type. Selection of target and session type can be performed sequentially, in either order, or can be performed jointly. For example, the navigation structure can list multiple available application instances with available session types for each. The navigation structure can present available combinations (target, session type) organized by target or by session type, or selectably by target or by session type.

Example Method for Establishing a Session

Figure 6:
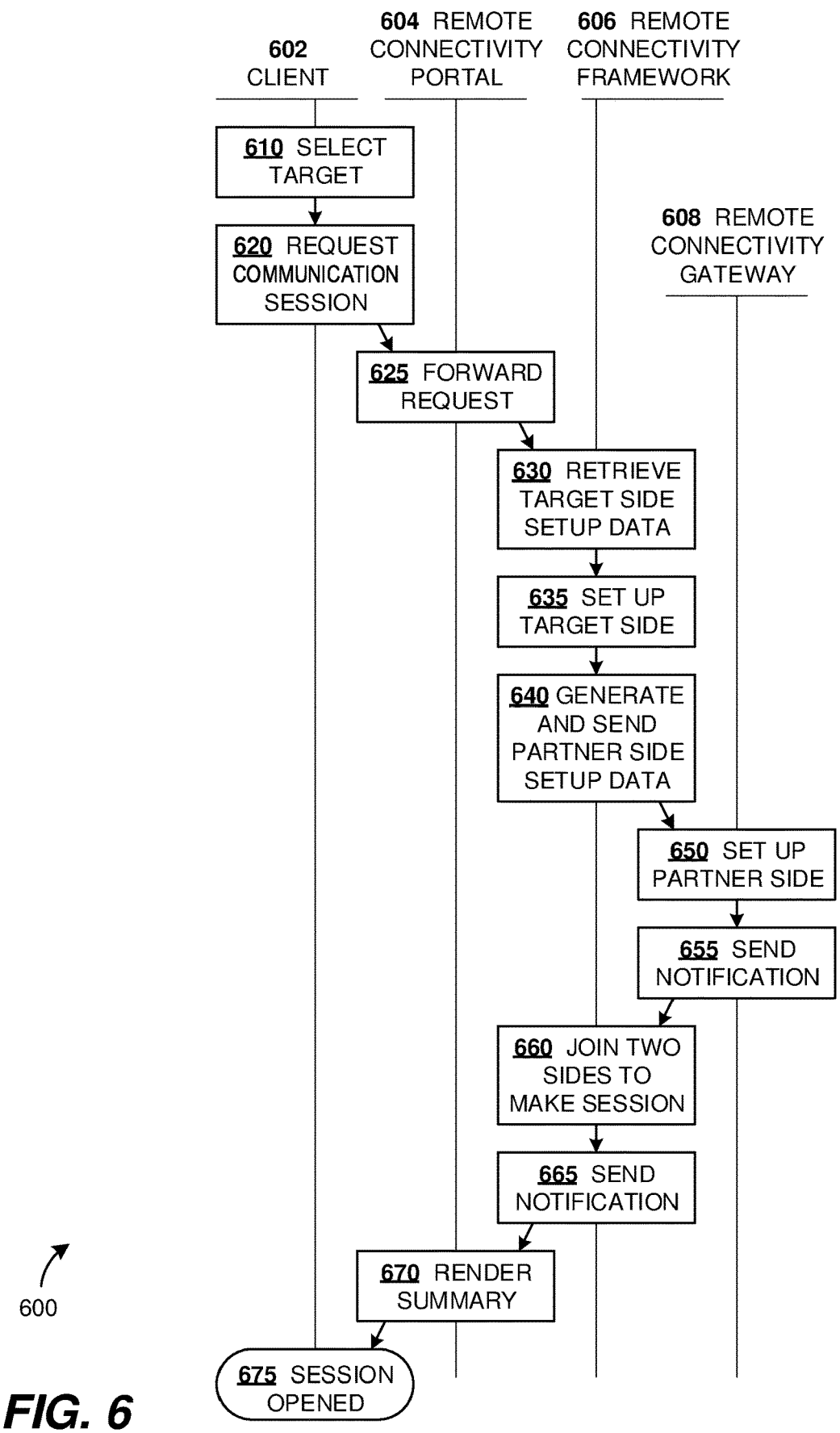
FIG. 6 is a flowchart of an example method for establishing a session according to the disclosed technologies.

FIG. 6 is a flowchart 600 of an example method for establishing a session according to the disclosed technologies. In this method, client 602, remote connectivity portal 604, remote connectivity framework 606, and remote connectivity gateway 608 interact to establish a session as requested from client 602. Client 602 can be a combination of software and hardware. Actions shown in the client column can be performed at the client or can be initiated from the client, for example by user input from an agent of the partner.

At process block 610, a target can be selected at a client 602, for example by a method similar to the method of FIG. 5. As described herein, an agent of a partner can make a selection of a target using client 602. At process block 620, a request for a communication session can be transmitted from client 602 to portal 604. The request can be forwarded from portal 604 to framework 606 at process block 625.

At process block 630, the framework 606 can retrieve target side setup data (e.g. routing string, port, keys, or passwords), with which a target-side link can be set up at block 635. The setup data can be retrieved from a backend server (such as 128) or from another repository of network information, singly or in combination. The target-side link can be similar to link 152 and can connect the framework 606 with an endpoint for the selected target in a target network.

At process block 640, the framework can generate partner-side setup data and send the setup data to gateway 608 in the partner network. At block 650, the gateway 608 can complete setting up of a partner-side link (similar to link 153) connecting the gateway 608 to the framework 606. Notification that establishment of the partner-side link is complete can be sent from gateway 608 to the framework 606 at block 655.

With both partner-side and target-side links established, the framework can join the links at block 660, to make a session between the partner-side gateway 608 and a target-side endpoint. In some examples, each link can be a tunnel, and the joined links can appear as a single tunnel from either session endpoint. With session established, a corresponding notification can be sent to the portal 604 at block 665. The portal can render a report of the established session to the client 602 at block 670. At block 675, the method terminates, with handling of the session request 620 complete and the session opened.

Numerous extensions and variations of this method can be implemented. The partner-side link can be established before the target-side link, or the two links can be set up and configured concurrently.

Example Method for Establishing a Connection

Figure 7:
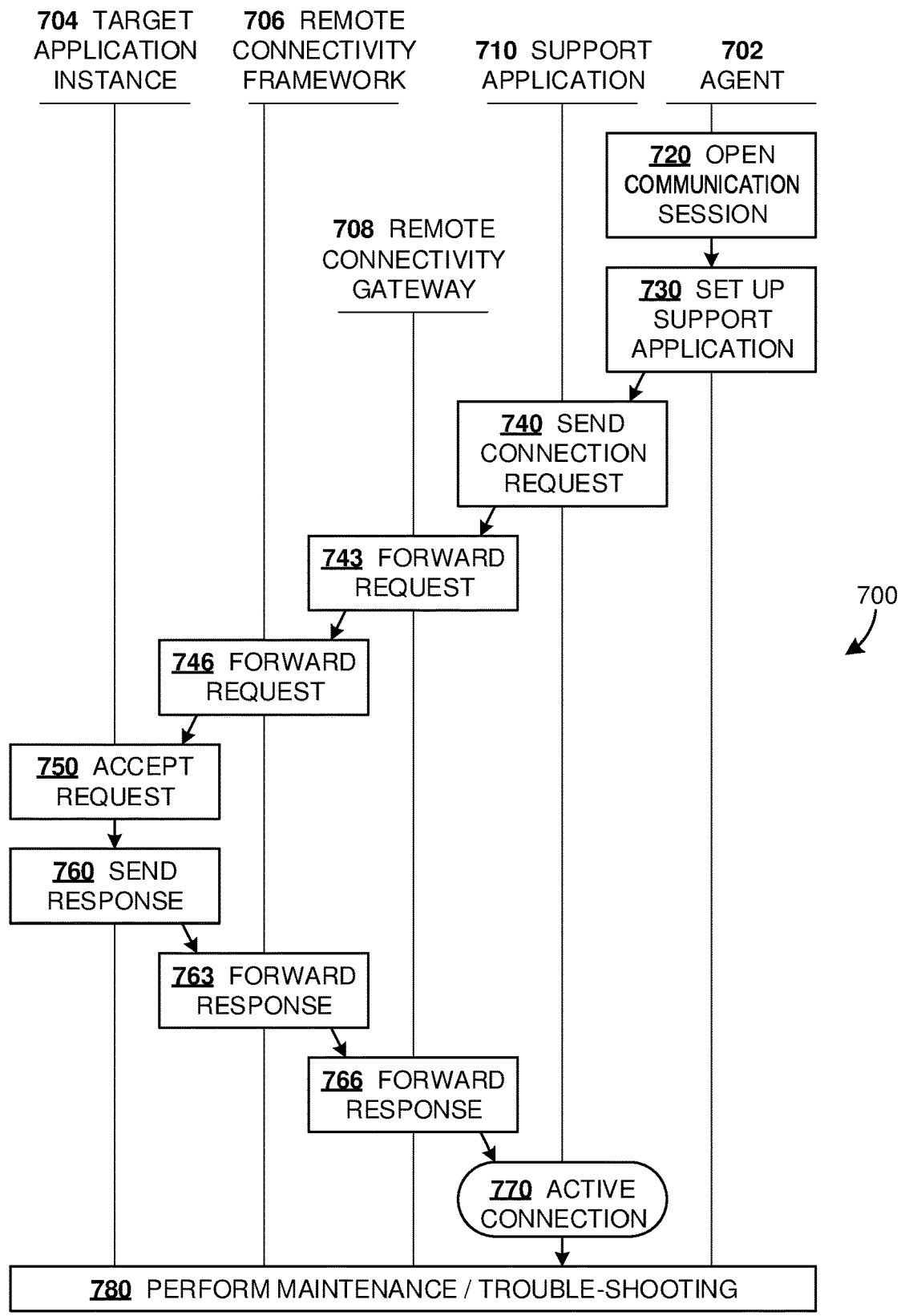
FIG. 7 is a flowchart of an example method for establishing a connection according to the disclosed technologies.

FIG. 7 is a flowchart 700 of an example method for establishing a connection according to the disclosed technologies. In this method, an end-to-end connection between a support application 710 and a target application instance 704 is established.

At process block 720, an agent can cause a communication session to be opened. Block 720 can be implemented using the methods of FIGS. 2, 6 or similar methods. At block 730, the agent can configure the support application for the desired activity, and at block 740 a connection request can be sent from support application 710 toward target application 704. The request can be forwarded by the remote connectivity gateway 708 and the remote connectivity framework 706 at blocks 743, 746 to reach the target application instance 704. The target 704 can accept the request at block 750 and respond accordingly at block 760. The response is forwarded, at blocks 763, 766, back to the support application 710 as shown. Thus, handling the connection request from block 740 is complete at block 770, with an active connection established.

Block 780 represents subsequent use of the active connection, in some examples, for troubleshooting or maintenance of target application instance 704. That is, an agent 702 can use support application 710 to interface with the target 704. Data communication between the support application 710 and the target application 704 can pass through gateway 708 and framework 706 over the active connection, which in turn can be implemented within the communication session opened at block 720.

Numerous variations and extensions of this method can be implemented. In some examples, target instance 704 can require authentication of the agent in between receiving the request 746 and accepting the request 750. In further examples, framework 706 can implement protocol translation or traffic control between partner-side communications and target-side communications. Any of requests from blocks 740, 743, 746 can time out if corresponding responses from blocks 766, 763, 760 are not received within respective predetermined time limits.

Example Method for Terminating a Session

Figure 8:
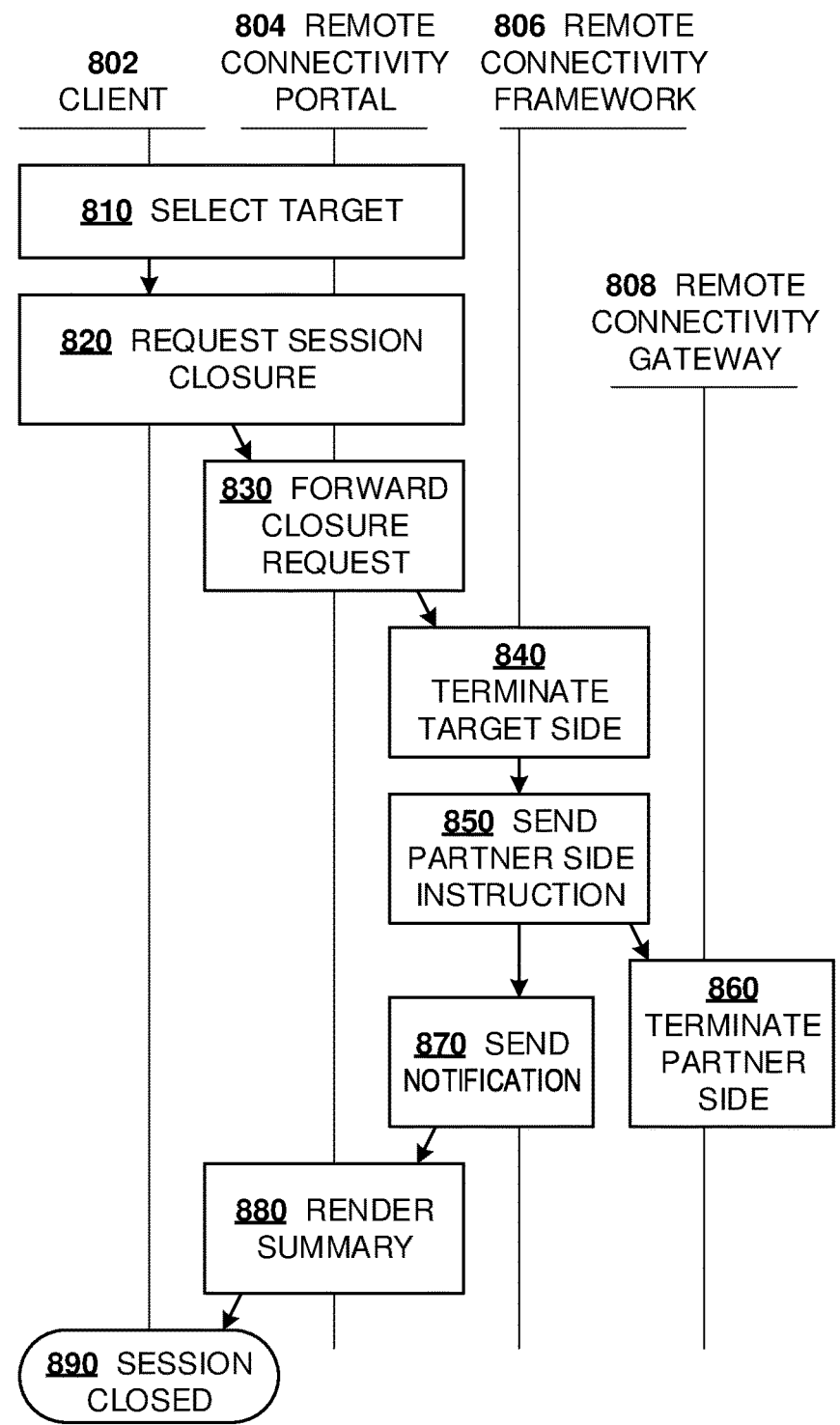
FIG. 8 is a flowchart of an example method for terminating a session according to the disclosed technologies.

FIG. 8 is a flowchart 800 of an example method for terminating a session according to the disclosed technologies. This method illustrates closing of a communication session from within a broker infrastructure, and can be a counterpart to the method of FIG. 6 which establishes a communication session.

At process blocks 810 and 820, a client 802 logged into the portal 804 can select a target and request closure of a communication session open with that target. At process block 830, the portal 804 can forward the closure request to the remote connectivity framework 806. Upon receipt of this request, the framework 806 can terminate the target side of the session at block 840, including teardown of an underlying communication link similar to 152. At block 850, framework 806 can also send an instruction to the remote connectivity gateway 808 to terminate the partner side of the communication session, which can be completed by gateway 808 at block 860. The instruction to the gateway 808 can be non-blocking, and framework 806 can proceed to block 870 without waiting to receive confirmation from gateway 808 that block 860 has been completed.

At block 870, a notification can be sent to portal 804 confirming that the closure request of block 830 has been completed, and at block 880 a summary of the communication session can be rendered to the client 802. With client 802 having confirmation of session closure, the method can terminate at block 890.

Numerous variations and extensions of this method can be implemented. In some examples, the agent logged in at a client may have only a single open session, and the closure request of block 820 can be performed without selection of a target at block 810. That is, block 810 can be omitted. In other examples, the target can have multiple sessions open, and block 810 can additionally require selection of a particular session for closure. In further examples, all open sessions to the instant target can be closed together (sequentially or in parallel), with similar operations as shown in FIG. 8, for each of the sessions being closed.

Example Configuration of Connection Types

Figure 9:
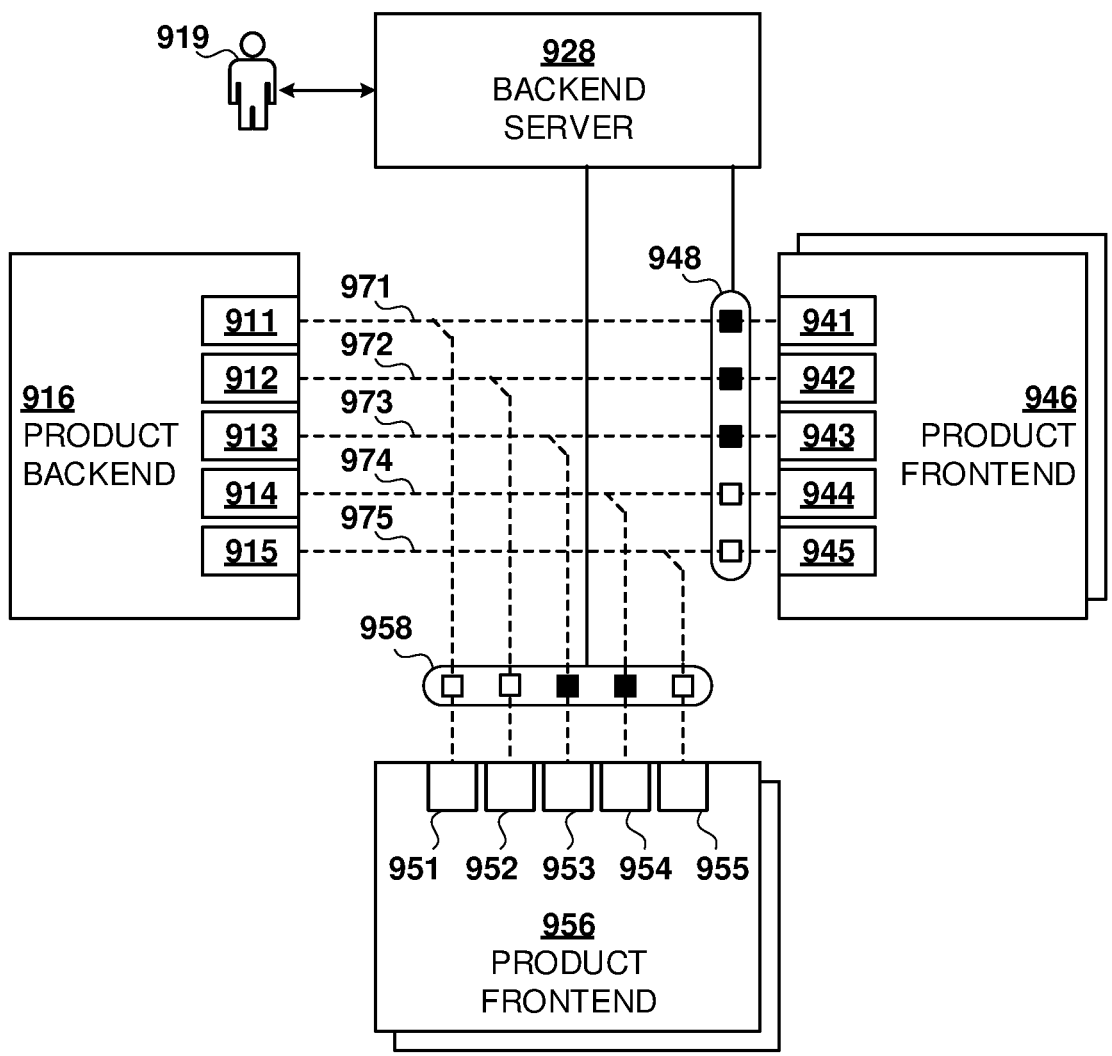
FIG. 9 is a diagram illustrating enabled and disabled connection types between a product backend and product frontends in an example of the disclosed technologies.

FIG. 9 is a diagram 900 illustrating enabled and disabled connection types from product frontends to a product backend. Product backend 916 can offer multiple software interfaces 911-915 for respective connection types. At a first partner computing environment, one or more product frontends 946 can offer corresponding interfaces 941-945 for these connection types. Similarly, at another partner environment, one or more product frontends 956 can offer corresponding interfaces 951-955. The corresponding logical connection paths are shown by dashed lines 971-975. For example, backend interface 913 can be connected to from interface 943 of frontend 946, or from interface 953 of frontend 956. Supported connection types can include, without limitation: screenshare, remote terminal or command-line access, a webpage or browser interface, source code debugging, an interactive database session, an R/3 connection, a mobile app, or other interfaces using e.g. TCP-based protocols.

The possible logical connection paths are annotated with gates 948, 958 illustrated as solid squares or open squares. The solid squares indicate connection paths that are authorized or configured as available in information stored at backend server 928. The open squares indicate connection paths that are unauthorized or configured as unavailable. Thus, as illustrated, frontend 946 can access backend 916 with connection types corresponding to paths 971-973, but is blocked from utilizing connection types corresponding to paths 974-975. Meanwhile, frontend 956 can utilize connection types corresponding to paths 973-974, but is blocked from utilizing the other connection types illustrated.

In some examples, during session setup by an agent such as 149 at portal 135, the agent can be offered a selection of connection types among those for which the agent is authorized. To illustrate, a first agent can be authorized for only connection types 971-973. Then, when the requested session is established, only certain connection types can be allowed. In some examples, a remote connectivity framework such as 132 can monitor connection requests, and only one or more connection types selected by the agent (149) at a connectivity portal (135) can be permitted to go through to the target application instance. Other connection requests can be blocked and an error can be logged or notified to the agent via the remote connectivity portal. In additional examples, remote connectivity framework (132) can monitor connection requests, and only connection types for which the agent is authorized can be permitted to go through to the target application instance. Other connection requests can be blocked and an error can be logged or notified to the agent via the remote connectivity portal.

Also shown in FIG. 9 is a customer-side agent 919 able to configure authorizations at backend server 928. In some examples, agent 919 can authorize various partners or partner agents to use respective connection types at backend 916. That is, the authorizations 948, 958 can be configured by customer-side agent 919. In further examples, agent 919 can configure which partners or agents have access to backend 916. When an agent (149) is making a selection of a target application instance (116), connectivity portal (135) can restrict navigation choices to those backends for which the agent (149) or partner (140) has been authorized by agent 919.

A Generalized Computer Environment

Figure 10:
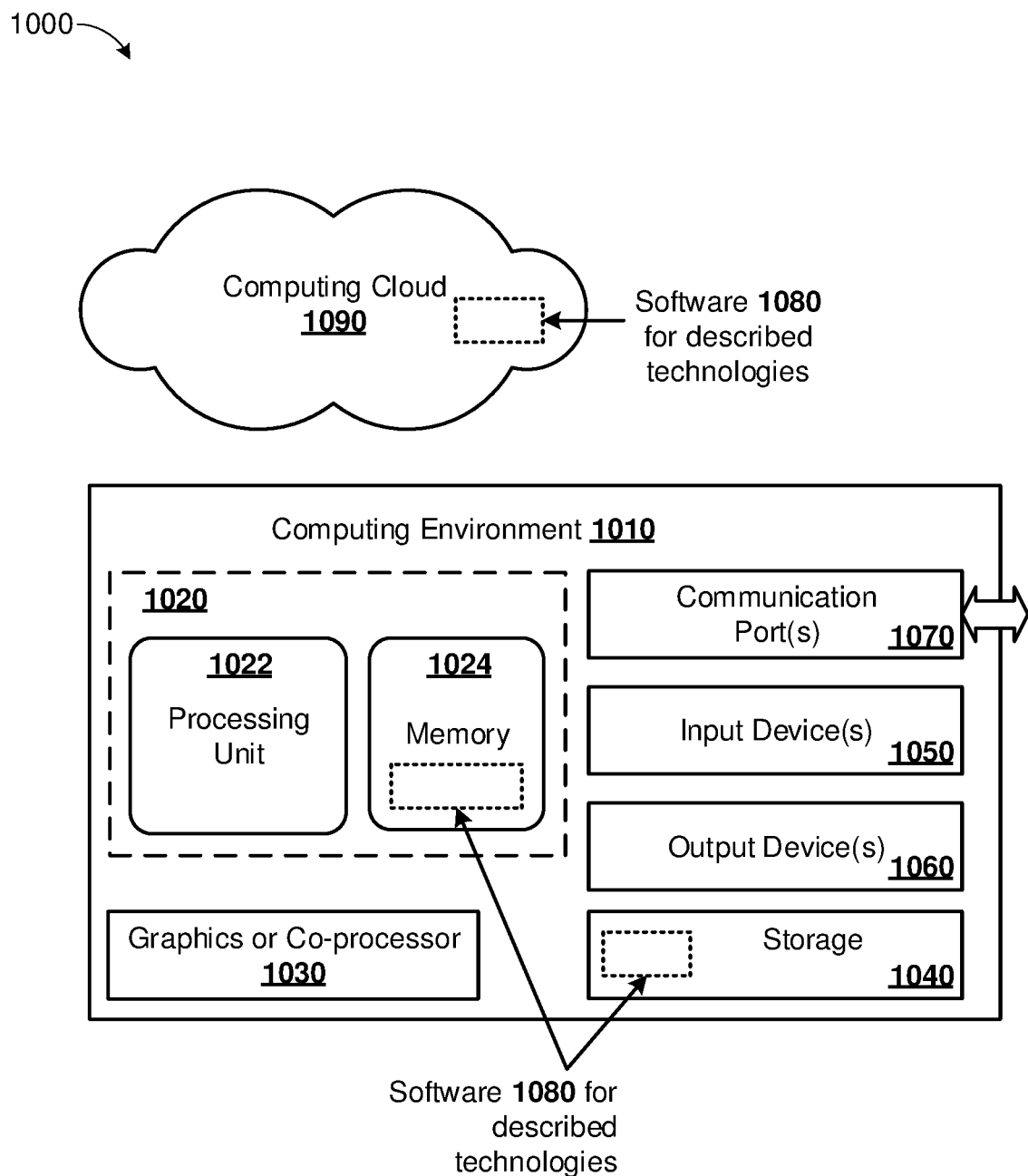
FIG. 10 is a diagram schematically depicting a computing environment suitable for implementation of disclosed technologies.

FIG. 10 illustrates a generalized example of a suitable computing system 1000 in which described examples, techniques, and technologies, including construction, deployment, operation, and maintenance of remote connectivity framework and associated infrastructure, or software components thereof, can be implemented according to disclosed technologies. The computing system 1000 is not intended to suggest any limitation as to scope of use or functionality of the present disclosure, as the innovations can be implemented in diverse general-purpose or special-purpose computing systems.

With reference to FIG. 10, computing environment 1010 includes one or more processing units 1022 and memory 1024. In FIG. 10, this basic configuration 1020 is included within a dashed line. Processing unit 1022 executes computer-executable instructions, such as for implementing any of the methods or objects described herein for selecting a target, managing a communication session, managing connections over a session, managing available backends, frontends, or session types, mediating data traffic, managing authorizations, or various other architectures, software components, handlers, managers, modules, or services described herein. Processing unit 1022 can be a general-purpose central processing unit (CPU), a processor in an application-specific integrated circuit (ASIC), or any other type of processor. In a multi-processing system, multiple processing units execute computer-executable instructions to increase processing power. Computing environment 1010 can also include a graphics processing unit or co-processing unit 1030. Tangible memory 1024 can be volatile memory (e.g., registers, cache, or RAM), non-volatile memory (e.g., ROM, EEPROM, or flash memory), or some combination thereof, accessible by processing units 1022, 1030. The memory 1024 stores software 1080 implementing one or more innovations described herein, in the form of computer-executable instructions suitable for execution by the processing unit(s) 1022, 1030. The memory 1024 can also store route tables; user interface navigation information; authorization tables; data structures for monitoring communications between partner-side entities and target-side entities; other configuration data, data structures including data tables, working tables, change logs, output structures, data values, indices, or flags, as well as other operational data.

A computing system 1010 can have additional features, such as one or more of storage 1040, input devices 1050, output devices 1060, or communication ports 1070. An interconnection mechanism (not shown) such as a bus, controller, or network interconnects the hardware components of the computing environment 1010. Typically, operating system software (not shown) provides an operating environment for other software executing in the computing environment 1010, and coordinates activities of the hardware and software components of the computing environment 1010.

The tangible storage 1040 can be removable or non-removable, and includes magnetic disks, magnetic tapes or cassettes, CD-ROMs, DVDs, or any other medium which can be used to store information in a non-transitory way and which can be accessed within the computing environment 1010. The storage 1040 stores instructions of the software 1080 (including instructions and/or data) implementing one or more innovations described herein.

The input device(s) 1050 can be a mechanical, touch-sensing, or proximity-sensing input device such as a keyboard, mouse, pen, touchscreen, trackball, a voice input device, a scanning device, or another device that provides input to the computing environment 1010. The output device(s) 1060 can be a display, printer, speaker, optical disk writer, or another device that provides output from the computing environment 1010.

The communication port(s) 1070 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1000 can also include a computing cloud 1090 in which instructions implementing all or a portion of the disclosed technologies are executed. Any combination of memory 1024, storage 1040, and computing cloud 1090 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, software objects, classes, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Occasionally, the term "computer" is used to refer to a computing system. Terms such as "computing node" or simply "node" can denote a computing system coupled to communicate with other computing systems in a network. Virtual processors, virtual hardware, and virtualized devices are ultimately embodied in a hardware processor or another form of physical computer hardware, and thus include both software associated with virtualization and underlying hardware.

Example Cloud Computing Environment

Figure 11:
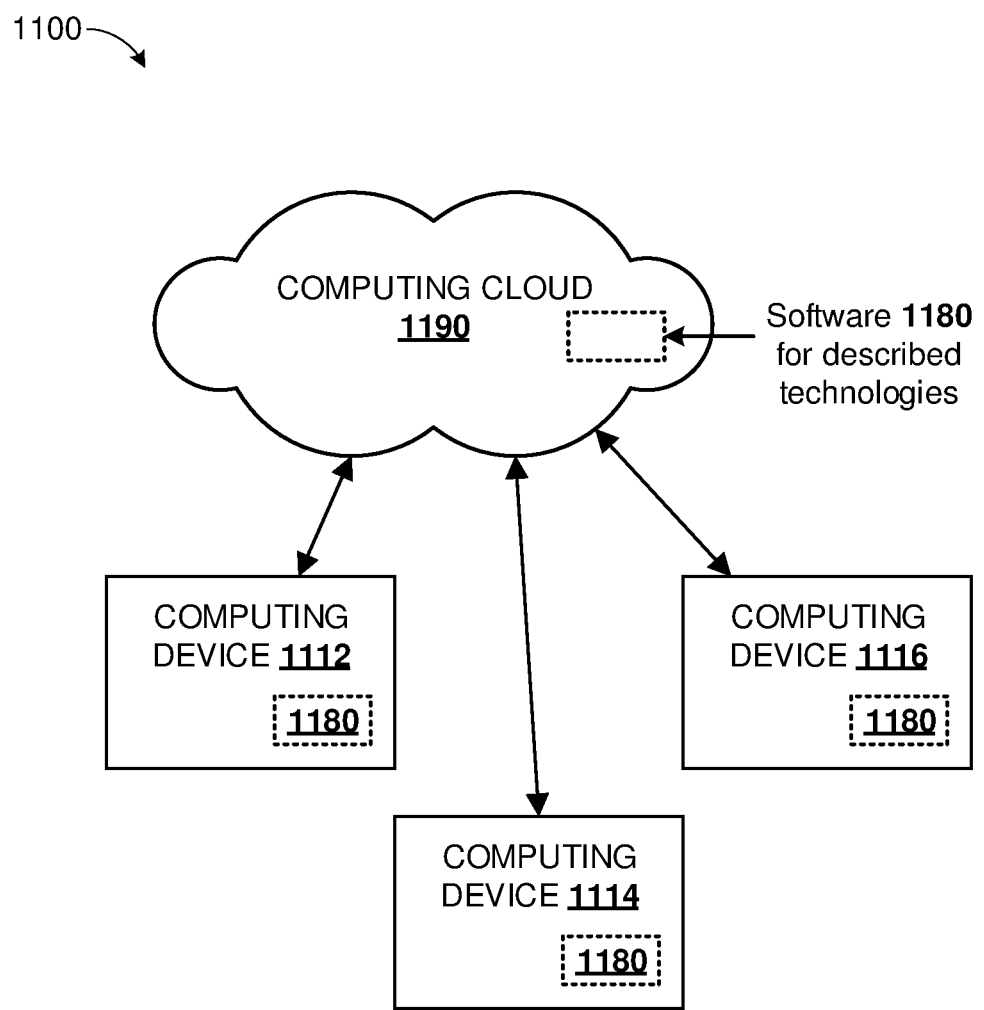
FIG. 11 is a diagram schematically depicting computing devices operating in conjunction with a computing cloud for implementation of disclosed technologies.

FIG. 11 depicts an example cloud computing environment 1100 in which the described technologies can be implemented. The cloud computing environment 1100 comprises a computing cloud 1190 containing resources and providing services. The computing cloud 1190 can comprise various types of cloud computing resources, such as computer servers, data storage repositories, networking resources, and so forth. The computing cloud 1190 can be centrally located (e.g., provided by a data center of a business or organization) or distributed (e.g., provided by various computing resources located at different locations, such as different data centers and/or located in different cities or countries).

The computing cloud 1190 can be operatively connected to various types of computing devices (e.g., client computing devices), such as computing devices 1112, 1114, and 1116, and can provide a range of computing services thereto. One or more of computing devices 1112, 1114, and 1116 can be computers (e.g., servers, virtual machines, embedded systems, desktop, or laptop computers), mobile devices (e.g., tablet computers, smartphones, or wearable appliances), or other types of computing devices. Communication links between computing cloud 1190 and computing devices 1112, 1114, and 1116 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1112, 1114, and 1116 can also be connected to each other.

Computing devices 1112, 1114, and 1116 can utilize the computing cloud 1190 to obtain computing services and perform computing operations (e.g., data processing, data storage, and the like). Particularly, software 1180 for performing the described innovative technologies can be resident or executed in the computing cloud 1190, in computing devices 1112, 1114, and 1116, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "accept," "apply," "authenticate," "call," "close," "combine," "compute," "configure," "connect," "determine," "disable," "display," "enable," "establish," "evaluate," "execute," "form," "forward," "generate," "identify," "indicate," "initiate," "input," "join," "link," "merge," "notify," "obtain," "open," "output," "perform," "process," "provide," "receive," "request," "respond," "return," "retrieve," "select," "send," "serve," "set," "store," "terminate," "test," "transmit," "update," or "use" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1024, and storage 1040. The terms computer-readable media or computer-readable storage media do not include signals and carrier waves. In addition, the terms computer-readable media or computer-readable storage media do not include communication ports (e.g., 1070) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C#, Curl, Dart, Fortran, Go, Java, JavaScript, *Julia*, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technologies are not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A system comprising:
a broker computing environment, comprising one or more computer processors with memory coupled thereto and one or more network interfaces, wherein the broker computing environment is separately coupled to a target computing environment and a partner computing environment over respective first and second networks;
a remote connectivity portal implemented in the broker computing environment and configured to:
authenticate a remote agent;
provide the authenticated remote agent with access to resources within the broker computing environment for selecting an application instance in the target computing environment and initiating a session request;
present the authenticated remote user with a menu listing a plurality of available application instances, wherein the presented available application instances are restricted to application instances for which the authenticated remote agent is authorized, wherein authorizations of the application instances for the authenticated remote user are configured at least in part by a customer-side agent; and
receive, from the authenticated remote agent, an indication of the selected application instance from the menu; and
a remote connectivity framework implemented in the broker computing environment and configured to respond to the session request from the authenticated remote agent by:
initiating a first secure link with the target computing environment; and
initiating a second secure link with the partner computing environment;
joining the first and second secure links to establish a secure duplex communication session between the partner and target computing environments.

2. The system of claim 1, wherein the remote connectivity framework is further configured to forward, between a frontend application in the partner computing environment and a backend application in the target computing environment, requests to establish connections within the secure duplex communication session and to forward data over the established connections.

3. The system of claim 1, further comprising a remote connectivity gateway implemented in the partner computing environment and configured to provide an endpoint for the second secure link within the partner computing environment.

4. The system of claim 1, wherein the secure duplex communication session is a first secure session, and the target computing environment is a first target computing environment; and wherein the remote connectivity framework is configured to concurrently support a plurality of secure sessions, including the first secure session, between:
respective remote computing environments, including the partner computing environment and at least a second remote computing environment, and
respective target computing environments, including the first target computing environment.

5. A computer-implemented method for managing a session request, comprising:
by a remote connectivity portal implemented in a broker computing environment, wherein the broker computing environment is separately coupled to a target computing environment and a partner computing environment over respective first and second networks:
presenting, to an agent of the partner computing environment, a plurality of available session types including a source code debug session type and a database session type;
receiving, from the agent of the partner computing environment, a selection of a session type from among the plurality of available types;
by a remote connectivity framework implemented in the broker computing environment:
initiating a first secure link with the target computing environment;
initiating a second secure link with the partner computing environment; and
joining the first and second secure links to establish a secure duplex communication session, having the selected session type, between the partner and target computing environments.

6. The computer-implemented method of claim 5, further comprising, by the broker computing environment:
forwarding a first request for establishing a connection within the secure duplex communication session, received from a partner application at the partner computing environment through the first secure link, to a target application instance at the target computing environment through the second secure link; and
forwarding data traffic between the partner application and the target application instance over the established connection.

7. The computer-implemented method of claim 5, wherein:
the selected session type is the source code debug session type; and
the secure duplex communication session enables the agent to perform live source code debugging at the target computing environment, from the partner computing environment.

8. The computer-implemented method of claim 7, wherein the target application instance is selected from among a plurality of available application instances by the agent and the plurality of available application instances is restricted to application instances for which the agent is authorized.

9. The computer-implemented method of claim 8, wherein a second instance of the available application instances, distinct from the target application instance, is located within a second computing environment, distinct from the target computing environment.

10. The computer-implemented method of claim 5, wherein the plurality of available types conform to respective TCP-based protocols.

11. The computer-implemented method of claim 5, wherein the selected session type is the database session type, and the secure duplex communication session is an interactive database session.

12. The computer-implemented method of claim 5, wherein the plurality of available session types is restricted to types for which the agent is authorized.

13. The computer-implemented method of claim 5, wherein links between the broker computing environment and the partner computing environment, including the first secure link, are restricted to links initiated from the broker computing environment.

14. The computer-implemented method of claim 5, further comprising:
   closing the secure duplex communication session, from within the broker computing environment, when work of the secure duplex communication session is complete.

15. The computer-implemented method of claim 5, wherein:
   the selected session type is the database session type or the source code debug session type.

16. One or more non-transitory computer-readable media storing executable instructions for a broker computing environment comprising one or more computer processors with memory coupled thereto and one or more network interfaces, wherein the broker computing environment is separately coupled to a target computing environment and a partner computing environment over respective first and second networks, and the instructions comprise:
   first instructions which, when executed in the broker computing environment, implement a remote connectivity portal configured to:
      authenticate a remote client;
      receive a selection of a target application in a target computing environment from the remote client; and
      send notifications to the remote client; and
   second instructions which, when executed in the broker computing environment, implement a remote connectivity framework configured to:
      initiate a secure link with a gateway in a remote partner computing environment, responsive to the selection of the target application;
      forward a request, received from a support application in the remote partner computing environment via the secure link, to the target computing environment, for establishing a connection between the support application and the selected target application in the target computing environment, wherein the support application is configured to provide maintenance or troubleshooting of the selected target application in the target computing environment, and wherein the target computing environment is distinct from the remote partner computing environment; and
      subsequent to acceptance, by the selected target application, of the forwarded request, forward data providing maintenance or troubleshooting of the selected target application, from the support application in the remote partner computing environment to the selected target application in the target computing environment.

17. The one or more non-transitory computer-readable media of claim 16, wherein the request is a first request, the first and second instructions are respectively executed on first and second hardware processors among the computer processors, and the instructions further comprise:
   third instructions which, when executed on one or more third hardware processors, implement the gateway in the remote partner computing environment, wherein the gateway is configured to:
      forward the request from the support application to the remote connectivity framework;
      forward data originating at the selected target application from the remote connectivity framework to the support application; and
      forward data destined for the selected target application from the support application to the remote connectivity framework.

18. The one or more non-transitory computer-readable media of claim 16, wherein the remote connectivity portal is further configured to:
   retrieve, from a server, information of a plurality of target applications, including the selected target application;
   present the information to a user of the remote client, wherein the presented information is restricted to target applications with which the user of the remote client is authorized to connect; and
   receive an indication of the selected target application from the presented information of the plurality of target applications.

19. The one or more non-transitory computer-readable media of claim 18, wherein the instructions further comprise:
   fourth instructions which, when executed on one or more fourth hardware processors, allow an agent of a given application among the plurality of target applications to update the information at the server, the updating including:
   enabling or disabling the authorization of the user of the remote client to the given application; and
   configuring which among a plurality of connection types are available to the user of the remote client for connecting to the given application.

20. The one or more computer-readable media of claim 16, wherein the broker computing environment is distinct from and coupled between (i) the remote partner computing environment and (ii) the target computing environment.

* * * * *